Jan. 22, 1929.
A. KÖHLER
1,699,667
ILLUMINATING DEVICE FOR MICROSCOPES
Filed July 9, 1925
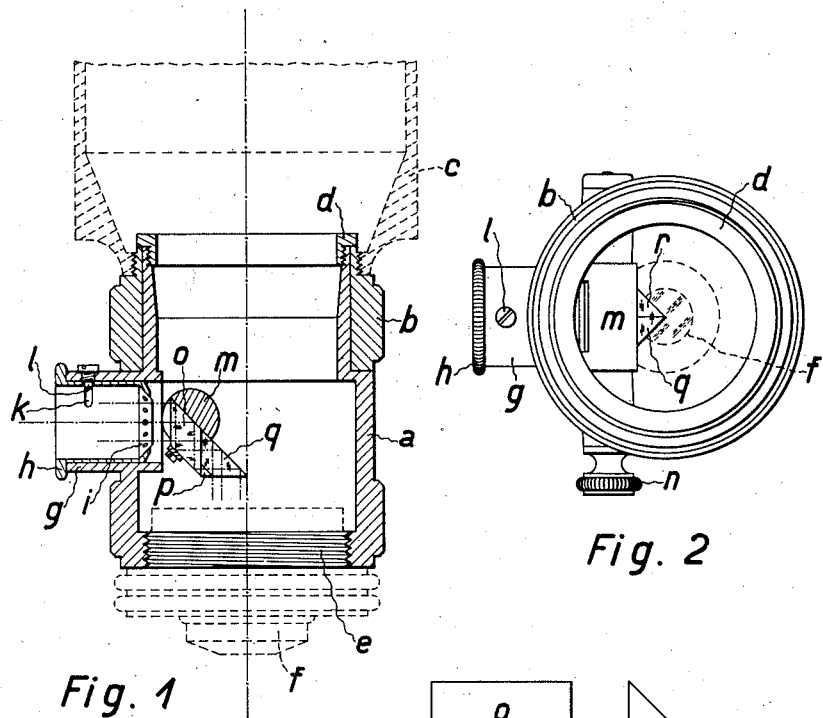
Fig. 1    Fig. 2
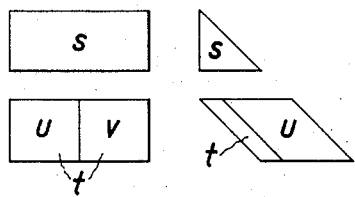
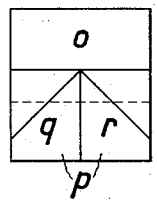
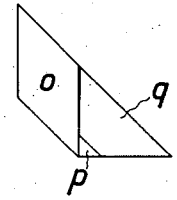
Fig. 3    Fig. 4
Fig. 5    Fig. 6
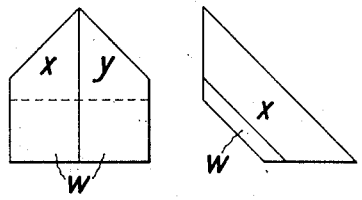
Fig. 7    Fig. 8
Inventor:
August Köhler Patented Jan. 22, 1929.

1,699,667

UNITED STATES PATENT OFFICE.

AUGUST KÖHLER, OF JENA, GERMANY, ASSIGNOR TO FIRM OF CARL ZEISS, OF JENA, GERMANY.

ILLUMINATING DEVICE FOR MICROSCOPES.

Application filed July 9, 1925, Serial No. 42,605, and in Germany July 12, 1924.

The Nachet vertical illuminator, which is frequently used with microscopic research with the lower magnifications for the illumination of opaque objects and in which the light is thrown upon the object through the objective with the aid of a prism inserted into the path of rays, has the drawback that the prism covers half the aperture of the objective. Although thereby the field of view of the microscope is not impaired, the resolving power of the objective is greatly reduced and the brightness of the image lessened. One therefore strives to find out an illuminating device which has the advantages of the Nachet vertical illuminator without entailing the aforesaid drawbacks. It means a progress in the sense of this problem if one chooses as optical part of the illuminating device according to the invention a prism system turning to the object a reflecting surface which consists of two parts inclined to each other like a roof because it is now possible to be satisfied with the covering of only about the fourth part of the objective-aperture, whereby the losses of resolving power and brightness will be greatly reduced. Thereby it is immaterial that this measure entails a side-exchange of the image of the source of light.

When investigating opaque objects with high power objectives one frequently also uses the Beck vertical illuminator, whose optical part is formed in lieu of a prism by a plane-parallel glass plate inclined to the optical axis of the objective at 45° because such an illuminator does not impair the resolving power of the objective. By using both vertical illuminators alternatively with the same object to be examined, one is bound to readjust the height of the source of light with each such change. This is due to the fact that in Beck's device, owing to the extension of the plane-parallel glass plate over the entire cross-section of the objective aperture, the axis of the pencil of light received by the optical part of the vertical illuminator lies higher than in the Nachet device, whose prism approaches as much as possible the rear lens vertex of the objective for the sake of the greatest possible freedom from reflections. The axis of the entering pencil of light is on the same level and both illuminating devices may be easily interchanged by using the new illuminating device after having completed it by providing an additional reflecting prism of a parallelogram-shaped cross section for the displacement of the entering luminous rays parallel to themselves, the size of this prism being determined by the difference in height of the axial position of the pencils of light coming into effect in the vertical illuminators by Nachet and by Beck. Thereby it is immaterial in which succession the different reflecting prisms are disposed.

A further improvement, consisting in a simplification of the optical part of the new illuminating device, can be attained by constructing the device in such a way that both reflecting prisms consist of one piece. In order to carry this out it is necessary to also make up the reflecting surface, nearest to the source of light, of the prism system of two parts inclined to each other like a roof, which adapt themselves in their angular position to the roof of the other prism. The side-exchange of the image of the source of light caused thereby, which is again immaterial in itself, is compensated again by the side-exchange caused by the other roof surface.

The accompanying drawing shows three constructional examples of the new illuminating device on an enlarged scale. Fig. 1 shows a cross section of the first example in an elevation, Fig. 2 a plan view; Figs. 3 and 4 represent the optical part of the device in a side elevation and an elevation respectively on an enlarged scale. On the same scale Figs. 5 and 6 show in a side elevation and an elevation the optical part of the second example, Figs. 7 and 8 that of the third example.

In the first example a tube $a$ can be screwed by means of a collar $b$ to the lower part of a microscope tube $c$ (shown by dash lines), whereby the collar $b$ is protected against displacement in its axial direction by a collar $d$ screwed in front of it. At the lower part of the tube $a$ provision is made for a thread $e$ for the reception of the objectives in short mount which are customary for the investigations in question and of which one is shown in the drawing by dash lines and denoted by $f$. The tube $a$ has a lateral light-entrance tube $g$, provided with an iris-diaphragm $i$, which is adjustable by means of a milled head $h$ and whose terminal positions are fixed by a pin $l$ sliding in a slit $k$. Behind the inner end of the light-entrance tube $g$ is disposed inside the tube $a$ a prism carrier $m$ which may be rotated from outside by means of a milled head $n$ in order to regulate the light-supply in the case of objectives with apertures of different diameter. On the prism carrier $m$ there are fixed two prisms $o$ and $p$ cemented together. The prism $o$ having a parallelogram-shaped cross section, displaces downwardly a part of the entering luminous rays by a double reflection parallel to themselves, whilst the remaining entering luminous rays traverse the prism $o$ unbroken. The luminous rays enter through the cemented surface of the prism $p$ which transmits the rays by means of two reflecting surfaces $q$ and $r$, forming a roof-edge, to the rear member of the objective $f$ in order to serve for illuminating from above the object assumed to be focussed below the objective.

The effect of the reflecting prism system $o$, $p$ may be attained in a different manner by two prisms $s$ and $t$ shown as a second constructional example (Figs. 5 and 6). The difference between both systems consists in this that, contrary to the aforesaid form, the additional prism lies in this case nearest to the object and that accordingly the reflecting surface, composed of two parts $u$ and $v$ inclined to one another like a roof, appertains to the additional system. A further difference is formed by the feature that the prisms $s$ and $t$ are not cemented.

Instead of the prisms $o$ and $p$ it is further possible to use a prism $w$, shown as a third constructional example (Figs. 7 and 8), with two reflecting surfaces $x$ and $y$ forming a roof surface. The path of rays corresponds in general to that of the first and the second example. Whilst, however, in that case the luminous rays undergo a side-exchange at the two reflecting surfaces $q$ and $r$ and $u$ and $v$ respectively, there arises in this case for those rays, which strike the reflecting surfaces $x$ and $y$ twice, an elimination of the side-exchange immaterial in itself, and only those luminous rays, which strike the reflecting surfaces $x$ and $y$ once, undergo the side-exchange.

The operation of the new illuminating device entirely corresponds to that of the Nachet vertical illuminator.

I claim:

1. In an illuminating device for microscopes for examining opaque objects a holder, adapted to be fixed in a microscope tube behind the microscope objective, the said holder being provided with an aperture adapted to allow the entrance of lateral light, and a reflecting prism, disposed within the said holder behind the said aperture, the said prism having a roof surface, the edge of which is inclined to the axis of the microscope objective, the said prism further having a surface inclined to the said edge at an angle of 45° and the corner of the said prism, formed by the said roof surface and the last named surface being located about in the optical axis of the said objective.

2. In an illuminating device for microscopes for examining opaque objects a holder, adapted to be fixed in a microscope tube behind the microscope objective, the said holder being provided with an aperture adapted to allow the entrance of lateral light, and a reflecting prism system, disposed within the said holder behind the said aperture and composed of a prism of a parallelogram-shaped cross section and a prism of a triangular cross section, the reflecting surface the most remote from the said aperture being a roof surface, the edge of which is inclined to the axis of the microscope objective, the said prism system further having a surface inclined to the said edge at an angle of 45° and the corner of the said prism, formed by the said roof surface, and the last named surface being located about in the optical axis of the said objective.

3. In an illuminating device for microscopes for examining opaque objects a holder, adapted to be fixed in a microscope tube behind the microscope objective, the said holder being provided with an aperture adapted to allow the entrance of lateral light, and a reflecting prism system, disposed within the said holder behind the said aperture, the said prism system being of one piece and consisting of a prism of a parallelogram-shaped cross section and a prism of a triangular cross-section, the reflecting surface the most remote from the said aperture being a roof surface, the edge of which is inclined to the axis of the microscope objective, the said prism system further having a surface inclined to the said edge at an angle of 45° and the corner of the said prism, formed by the said roof surface and the last named surface being located about in the optical axis of the said objective.

4. In an illuminating device for microscopes for examining opaque objects a holder, adapted to be fixed in a microscope tube behind the microscope objective, the said holder being provided with an aperture adapted to allow the entrance of lateral light, and a reflecting prism, disposed within the said holder behind the said aperture and containing a light-entrance surface and a light-exit surface, perpendicular to each other, and two reflecting surfaces, parallel to each other and inclined to the first-mentioned surfaces and to the axis of the microscope objective, the reflecting surface the most remote from the said aperture being a roof surface, the corner of the said prism, formed by the said roof surface and the said light-exit surface being located about in the optical axis of the said objective.

AUGUST KÖHLER.